United States Patent [19]
Bingham

[11] 4,000,990
[45] Jan. 4, 1977

[54] ADSORPTION PROCESS

[75] Inventor: Larry A. Bingham, Mission Viejo, Calif.

[73] Assignees: NRG Nufuel Company, Phoenix, Ariz.; Reserve Synthetic Fuels, Inc., Newport Beach, Calif. ; part interest to each

[22] Filed: Apr. 16, 1975

[21] Appl. No.: 568,668

[52] U.S. Cl. .................................. 55/30; 55/76
[51] Int. Cl.² .................................. B01D 53/04
[58] Field of Search ............ 210/30; 55/25, 26, 58, 55/62, 76

[56] References Cited
UNITED STATES PATENTS

| | | | |
|---|---|---|---|
| 2,899,474 | 8/1959 | Ricards .................................. | 55/76 |
| 3,176,444 | 4/1965 | Kiyonaga ............................ | 55/62 X |
| 3,430,418 | 3/1969 | Wagner ............................... | 55/62 X |
| 3,533,221 | 10/1970 | Tamura ............................... | 55/76 X |
| 3,636,679 | 1/1972 | Batta .................................... | 55/26 |
| 3,717,974 | 2/1973 | Batta .................................... | 55/58 |
| 3,719,025 | 3/1973 | Heinze et al. ........................ | 55/31 |
| 3,788,037 | 1/1974 | Shell et al. ........................... | 55/58 |
| 3,839,847 | 10/1974 | Banikiotes et al. .................... | 55/58 |

*Primary Examiner*—Frank A. Spear, Jr.
*Assistant Examiner*—Ethel R. Cross
*Attorney, Agent, or Firm*—Gordon L. Peterson

[57] ABSTRACT

A process for purifying a fluid stream which includes an impurity and a product fluid comprising providing three adsorption zones, cycling each of the adsorption zones on stream for the adsorption of the impurity from the fluid stream in a predetermined sequence to provide a substantially uninterrupted flow of the product fluid from the adsorption zones, desorbing the impurity from each of the adsorption zones in a predetermined sequence by sequentially reducing the pressure within each of the adsorption zones sufficiently to desorb the impurity, and repressurizing each of the adsorption zones subsequent to the desorption of such adsorption zone to make such adsorption zone ready for subsequent use for on stream adsorption of the impurity. The duration of the period of desorption for each of the adsorption zones is at least as great as about the duration of the period of on stream adsorption of the impurity. The desorption of a first of the adsorption zones occurs during at least the latter portion of the period that a second of the adsorption zones is on stream for the adsorption of the impurity and during at least an initial portion of the period that a third of the adsorption zones is on stream for the adsorption of the impurity.

22 Claims, 3 Drawing Figures

Fig. 2.

ADSORPTION PROCESS

BACKGROUND OF THE INVENTON

Prior art fluid purification and separation processes typically include passing a fluid stream which includes an impurity through a first adsorption zone. The impurity is adsorbed on the adsorbent material of the first adsorption zone and a purified fluid or a product fluid is discharged from the first adsorption zone. The fluid stream is passed through the first adsorption zone until the adsorbent material nears impurity saturation, and the impurity being adsorbed nears breakthrough into the product fluid.

During the period that the first adsorption zone is on stream for the adsorption of impurity, a second adsorption zone which has previously been on stream is being desorbed to remove the impurity from the adsorbent material of the second adsorption zone. Thus, when the adsorbent material of the first adsorption zone nears impurity saturation, the flow of the fluid stream through the first adsorption zone is terminated, and the fluid stream is passed through the second adsorption zone. Thereafter, the second adsorption zone is on stream for the adsorption of impurity while the first adsorption zone is desorbed to prepare it for subsequent use on stream.

Factors which complicate the ostensibly simple cycling of the adsorption zones between adsorption and desorption cycles are that the discharge of product fluid should be continuous and the number of adsorption zones should be minimized. The selection of a cycle is further hampered by the face that the desorption cycle includes several different phases. For example, adsorption is tyically carried out at a first relatively high pressure, and the first phase of the desorption cycle may be the depressurization of the adsorption zone. Depressurization may be used to recover or otherwise dispose of some of the fluid trapped in the adsorption zone to the extent that such fluid is as pure as the feed fluid.

In the second phase of the desorption cycle, the impurity previously adsorbed from the adsorbent material is removed. This may be accomplished by further reducing the pressure in the adsorption zone. In order to maximize impurity removal, this phase of the desorption cycle should be as long as possible and preferably at least as long as the period of adsorption.

Finally, in the third phase of the desorption cycle, the adsorption zone must be repressurized back to approximately the first relatively high pressure. The repressurization makes the adsorption zone ready for subsequent adsorption.

These and other considerations have brought about the use of adsorption systems which include at least three adsorption zones. Typical of this are the processes disclosed in U.S. Pat. No. 3,176,444 issued to Kiyonaga. However, with the patented processes either the impurity removal phase is relatively short in which event impurity removal is not maximized or up to five adsorption zones are required. In addition, except for systems having four or more adsorption zones, the vacuum equipment of the Kiyonaga system is not used continuously, and this results in inefficient utilization of the vacuum equipment.

SUMMARY OF THE INVENTION

The present invention maximizes impurity removal and minimizes the number of adsorption zones while maintaining continuous flow of product fluid. In addition, the pressure reduction equipment, which may be vacuum equipment, is substantially continuously utilizable. This allows a smaller vacuum system to be used.

With the present invention thorough and efficient impurity removal is assured by providing an impurity removal phase of a duration of at least about as long as the duration of the adsorption cycle. In other words about as much time is spent in cleaning the adsorbent material as is spent in utilizing such adsorbent material for adsorption.

These and other desirable results can be obtained in an adsorption system having as few as three adsorption zones by using the sequencing concept of this invention. One characteristic of this sequencing concept is that the desorption of a first of the adsorption zones occurs during at least the latter portion of the period that a second of the adsorption zones is on stream for the adsorption of the impurity and during at least an initial portion of the period that a third of the adsorption zones is on stream for the adsorption of the impurity.

With the present invention a first of the adsorption zones is used for on stream operation by introducing a fluid stream into the inlet of such adsorption zone contacting the fluid stream with the adsorbent material at a first pressure to thereby adsorb the impurity on the adsorbent material and provide a product fluid. The product fluid is then discharged from the outlet of the first adsorption zone.

With the sequencing concept of this invention, a portion of the time that the first adsorption zone is on stream for the adsorption of the impurity, both of the second and third adsorption zones are in pressure reduction phases. For example, while the first adsorption zone is on stream, the second adsorption zone which has previously been used to adsorb the impurity from the fluid stream is undergoing pressure reduction to a second pressure. The manner in which pressure reduction is carried out in the second adsorption zone will vary depending upon the results desired and the pressure utilized in the cycle. For example, if adsorption is carried out at greater than atmospheric pressure, the pressure reduction in the second adsorption zone may be a depressurizing operation in which the second adsorption zone is vented to approximately atmospheric pressure. If desired, the depressurization operation, or a portion thereof, may be utilized to recapture fluid in the head space and void spaces in the second adsorption zone. Such fluid may include the fluid supplied to the adsorption zone and some product fluid. To the extent that recycling of this type is employed, the process is made more efficient. Alternatively, or in addition thereto, the fluid obtained during some or all of this pressure reduction step can be vented to atmosphere, burned, otherwise disposed of, or retained for subsequent utilization. Depending upon the pressure, temperature, and adsorbent material characteristics, the first phase of pressure reduction may result in some impurity removal.

The third adsorption zone, which has previously been reduced in pressure to the second pressure, is reduced in pressure to a third pressure which is sufficiently low to desorb the impurity from the third adsorption zone.

Although the values for the third pressure can be established by those skilled in the art depending upon the results desired, the third pressure may be less than atmospheric in which event appropriate vacuum equipment must be utilized. Thus, both the second and third adsorption zones are operated in pressure reducing phases for at least a portion of the time that the first adsorption zone is on stream for the adsorption of the impurity.

Before the third adsorption zone can be utilized for on stream operation, the pressure reducing operation therein must be terminated. Following this, the third adsorption zone is repressurized during at least a part of the period that product fluid is being discharged from the first adsorption zone. The timing is such that the third adsorption zone is ready for on stream operation before the adsorbent material of the first adsorption zone is saturated with the impurity. Accordingly, at a selected instant the third adsorption zone is switched to on stream operation and then the first adsorption zone is switched off stream and a first stage pressure reduction phase is initiated therein.

The pressure reduction of the second adsorption zone to the second pressure is completed by the time that the third adsorption zone begins the repressurizing phase. Thus, the second adsorption zone begins second stage pressure reduction to the third pressure substantially simultaneously with the initiation of the repressurization of the third adsorption zone. If vacuum equipment is utilized for second stage pressure reduction, it is used substantially continuously while the first adsorption zone is on stream by switching the vacuum system from the third adsorption zone to the second adsorption zone.

A characteristic of the present invention which contributes to substantially continuous utilization of the vacuum equipment and to maximizing the length of the impurity removal phase is that the second adsorption zone continues in the impurity removal phase during a portion of the period that product fluid is being discharged from the first adsorption zone and during a portion of the period that product fluid is being discharged from the third adsorption zone. In other words, the second adsorption zone continues in the impurity removal phase while the first and third adsorption zones are being sequenced to place the third adsorption zone on stream and the second adsorption zone in an initial pressure reduction phase.

The process described above can be continuously repeated without interrupting the flow of product fluid and with at least the same period of time being used for impurity removal as for on stream operation of each of the adsorption zones. Impurity removal occurs during all of the second phase pressure reduction and during a portion of the first phase pressure reduction. Although more than three adsorption zones can be utilized, no more than three are required.

Each of the adsorption zones includes appropriately confined adsorbent material. Although various arrangements can be utilized, there are advantages to including in each adsorption zone first and second generally upright towers with each of the towers containing adsorbent material. The towers of each adsorption zone are arranged for series flow therethrough at least when the towers are on stream for the absorption of the impurity. One advantage of this arrangement is that each of the towers is shorter than would otherwise be necessary. This in turn permits location of a plant employing applicant's invention in areas where a plant containing taller towers might be prohibited for aesthetic or environmental reasons. Even where taller towers would be permitted by regulating agencies, the shorter towers are preferred for aesthetic and environmental reasons.

The adsorbent material of the adsorption zones can be thermally regenerated. However, thermal regeneration hastens destruction of the adsorbent material, and for this reason it is desirable to minimize the frequency of thermal regeneration.

One way to accomplish this is to pass a feed fluid stream through a first pretreating zone prior to passing the fluid stream to the first adsorption zone. The fluid stream contacts the adsorbent material of the first pretreating zone to adsorb a portion of the impurity in the adsorbent material and to provide a partially purified fluid stream which is fed to the first adsorption zone. The adsorption of a portion of the impurity in the first pretreating zone reduces the frequency of thermal regeneration of the adsorption zones and significantly reduces the possibility of irreversibly contaminating the adsorbent material of the adsorption zones.

In order that the feed fluid stream can be continuously pretreated, a second pretreating zone is provided. The second pretreating zone undergoes thermal regeneration while the first pretreating zone is on stream. This is preferable to frequently thermally regenerating the adsorption zones because less expensive adsorbent material can be utilized in the pretreating zones. Furthermore, to the extent that thermal regeneration may result in some sacrifice of adsorbent material, it is more economical and efficient to sacrifice the adsorbent material in the pretreating towers rather than in each of the adsorption zones.

The invention can best be understood by reference to the following description taken in connection with the accompanying illustrative drawing.

DESCRIPTION OF THE PREFERRED EMBODIMENT

Figures 1, 3:
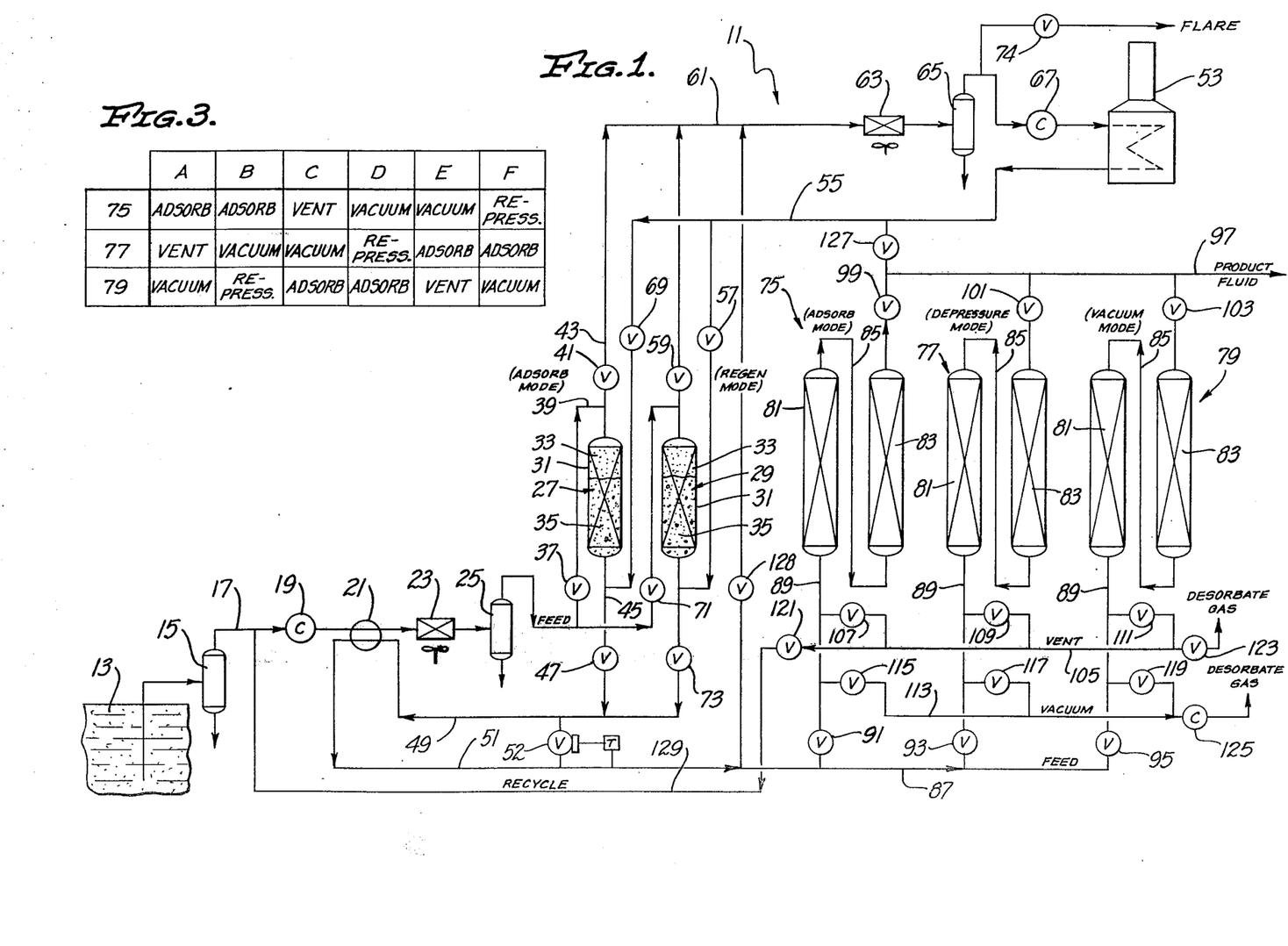
FIG. 1 is a schematic diagram of an adsorption system constructed in accordance with the teachings of this invention.
FIG. 3 is a table setting forth a preferred way in which the adsorption zones may be sequenced.

FIG. 1 shows an adsorption system 11 which is adapted for purifying a feed fluid stream which comprises an admixture of impurity and product fluid. The feed fluid stream is purified in an adsorption process. The "impurity" is the component or components of the feed fluid stream which become the adsorbate in the process. Thus, the material described as impurity is not limited to a common definition of the term which describes something unwanted and to be discarded. In other words, the impurity may be removed from the adsorbent material and saved for use or sale or it may be discarded as waste material.

The product fluid is the nonadsorbed fluid in the feed fluid stream. The product is not necessarily the component or components of the feed fluid stream which are desirable or sought after in the purification process.

The feed fluid stream may be of any type, the components of which can be separated with an adsorption process. The adsorption system 11 is particularly adapted for use with a feed stream which is derived from a sanitary landfill 13, i.e. a landfill gas. Sanitary landfills provide fluids which comprise methane and other components such as water, carbon dioxide, hydrogen sulfide, mercaptans, and amines. By way of example, and not by way of limitation, the feed fluid stream obtained from the sanitary landfill 13 may have the following composition:

| Component | Percent by Volume |
|---|---|
| $H_2$ | 0.048 |
| $O_2$ | 0.06 |
| $N_2$ | 0.25 |
| $CO_2$ | 42.59 |
| $H_2S$ | 0.002 |
| $CH_4$ | 49.78 |
| $C_3H_8$ | 0.01 |
| $i-C_4H_{10}$ | — |
| $n-C_4H_{10}$ | |
| $i-C_5H_{12}$ | 0.01 |
| $n-C_5H_{12}$ | 0.01 |
| $C_6+$ | 0.64 |
| $H_2O$ | 6.59 |

In the process described hereinbelow, methane is the product fluid and the other components constitute the impurity.

The feed fluid stream which, for example, may be at about 100° F. and 13.8 psia enters a vapor liquid separator 15 which separates the vapor and liquid phases in a feed fluid stream. The liquid component which consists essentially of condensed water vapor and hydrocarbon vapor is pumped out of the separator 15, and the feed fluid stream in substantially vapor phase is conducted by a conduit 17 to a compressor 19 which increases the temperature and pressure of the feed fluid stream. By way of example and not by way of limitation, the feed fluid stream at the discharge of the compressor 19 may be at about 69 psia and 320° F. The feed fluid stream next passes through an economizing heat exchanger 21 of the counterflow type which cools the feed fluid. The feed fluid is further cooled by an appropriate cooler, such as an air cooler 23, following which it passes through a second vapor liquid separator 25 where additional water and hydrocarbon liquids are removed.

The adsorption system 11 includes identical pretreating zones 27 and 29. Each of the pretreating zones 27 and 29 includes an upright tower 31 packed with adsorbent materials 33 and 35. In the embodiment illustrated, the adsorbent material 33 fills approximately the upper one-third of each of the towers 31 and the adsorbent material 35 fills the lower two-thirds of each of these towers. The adsorbent material 33 should be capable of selectively adsorbing substantially all of the impurity except water and carbon dioxide. For a feed fluid stream having the composition noted above, the adsorbent material 33 should adsorb the $C_4H_{10}$, $C_5H_{12}$, $C_6+$, and the $H_2S$ as well as any heavy hydrocarbon constituents such as alkenes, mercaptan compounds, aldehydes, ketones, and other trace heavy hydrocarbons. Although it is not necessary, the adsorbent material 33 may also be capable of adsorbing some water and some carbon dioxide. For example, the adsorbent material 33 may be activated carbon such as the type known as BPL carbon sold by Calgon Corporation of Pittsburgh, PA, activated alumina, or natural or synthetic molecular sieves.

The adsorbent material 35 is provided primarily for the adsorption of water. However, adsorbent materials that are capable of adsorbing any impurities, other than carbon dioxide, which get through the adsorbent material 33 are also desirable. Of course, carbon dioxide may also be adsorbed; however, a majority of the carbon dioxide is adsorbed later as described hereinbelow. For example, the adsorbent material 35 may be activated alumina or acid resistant molecular sieves such as natural zeolite molecular sieves.

Of course, the particular adsorbent material utilized in the towers 31 will differ depending upon the components which it is desired to adsorb. The examples of adsorbent materials referred to above are given solely by way of illustration. Similarly, the adsorbent material within each of the towers 31 may be of the same material. However, the one advantage of utilizing two different adsorbent layers is that multiple adsorbents can often be more effective in meeting all of adsorption requirements for the towers 31.

Figure 2:
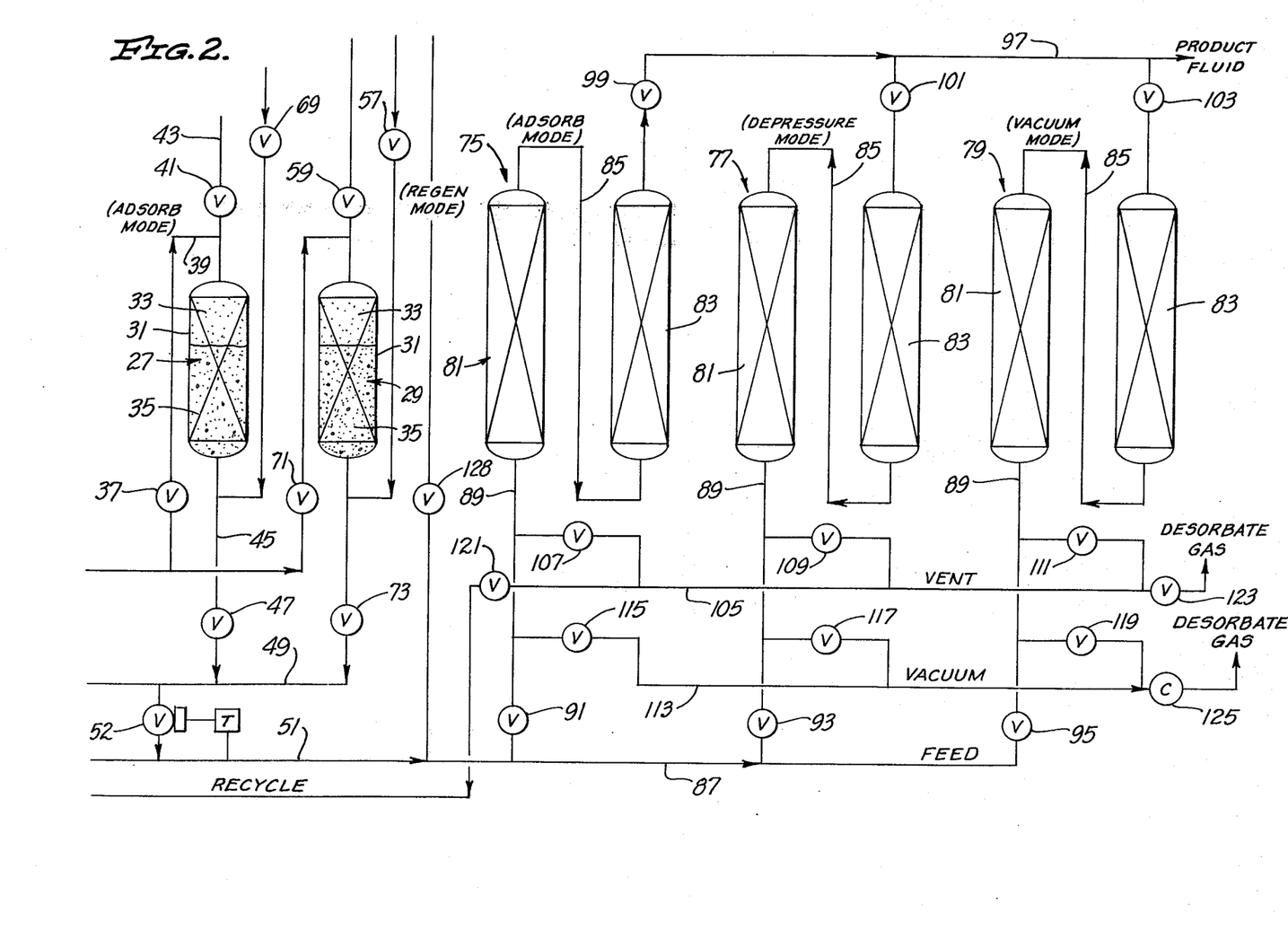
FIG. 2 is an enlarged schematic diagram of a portion of the adsorption apparatus shown in FIG. 1.

The pretreating zones 27 and 29 are operated so that one of the pretreating zones is on stream for the adsorption of impurity while the other of the pretreating zones is being thermally regenerated. In the mode of operation illustrated in FIGS. 1 and 2, the pretreating zone 27 is on stream and the pretreating zone 29 is being thermally regenerated. Specifically, the feed fluid stream passes from the separator 25 through a valve 37 and a conduit 39 at, for example, about 66 psi and 100° F. into the upper end of the tower 31 of the zone 27. A valve 41 is closed during this time to prevent the escape of the feed fluid stream through a conduit 43.

The feed fluid stream passes through the adsorbent material 33 and impurity is adsorbed on the material 33 as noted above. The feed fluid stream leaving the adsorption material 33 consists essentially of methane, water, carbon dioxide, and perhaps some trace amounts of other impurity not adsorbed on the adsorbent material 33. The adsorption material 35 adsorbs substantially all of the water and some of the trace comtaminants. Accordingly, a partially purified fluid stream consisting essentially of methane, carbon dioxide, and trace impurity is discharged from the lower end of the tower 31 of the pretreating zone 27 via a conduit 45. The partially purified fluid stream then passes through a valve 47, a conduit 49 (FIG. 1), and the economizing heat exchanger 21. The partially purified fluid stream leaves the economizing heat exchanger 21 by way of a conduit 51 at, for example, a temperature of about 200° F. and about 65 psia and from there is subjected to a subsequent adsorption process as described hereinbelow. If desired, the heat exchanger 21 can be bypassed by a thermistatically controlled bypass valve 52.

During at least a portion of the period that the pretreating zone 27 is on stream for the adsorption of impurity, the pretreating zone 29 is being thermally regenerated in a conventional manner. As shown in FIG. 1, the regeneration loop includes a heater 53, a conduit 55, a valve 57, the pretreating zone 29, a valve 59, a conduit 61, an aerial cooler 63, a vapor liquid separator 65, and a compressor 67. The fluid in the regeneration loop is compressed by the compressor 67, heated in the heater 53 to about 650° F., and passed through the conduit 55 and the valve 57 to the pretreating zone 29. In the embodiment illustrated, the hot regeneration gas flows countercurrently, i.e. opposite to the direction of the flow of the feed fluid stream through the pretreating zone 29. The fluid is sufficiently hot to desorb the adsorbed impurity on the adsorbent materials 33 and 35. The hot fluid with the desorbate then passes through the valve 59, and the conduit 61 to the cooler 63 and the separator 65. The cooler 63 cools the fluid sufficiently to condense the condensible impurities which are separated from the vapor phase components in the separator 65. A valve 69 is closed during this period to prevent the hot hot regeneration gas from being supplied to the pretreating zone 27. A valve 73 is also closed during this period.

When substantially all of the impurity has been removed from the adsorbent materials 33 and 35, the heater 53 is shut down and the fluid in the regeneration loop is circulated to cool the pretreating zone 29. Prior to cooling, a valve 74 is opened to vent the gases in the regeneration loop to a flare for burning.

Next, the pretreating zone 29 is repressurized by opening the valve 73. This repressurizes the pretreating zone 29 with partially purified fluid from the pretreating zone 27. During the repressurization of the pretreating zone 29, the valves 57 and 59 are closed. Upon completion of repressurization, the valve 73 is closed. Then the fluid is allowed to circulate to cool pretreating zone 29. By way of example and not by way of limitation, each of the pretreating zones 27 and 29 may be on stream for three-hour periods.

Before the adsorbent materials 33 and 35 of the pretreating zone 27 reach saturation, the pretreating zone 29 is cooled and ready for on stream operation. To switch the pretreating zone 27 off stream and the pretreating zone 29 on stream, a valve 71 is opened to provide the feed fluid stream to the upper end of the pretreating zone 27, and then the valve 73 is opened to permit discharge of the partially purified fluid stream from the pretreating zone 29 into the conduit 49. Next, the valve 37 is closed to terminate the flow of feed fluid gas into the pretreating zone 27, and the valve 47 is closed. Finally, the valves 57 and 59 are closed. To thermally regenerate the pretreating zone 27, the valve 69 is opened to supply hot regeneration gas to the lower end of the tower 31 of the pretreating zone 27, and the valve 41 is opened to permit discharge of the hot desorbate fluid into the conduit 61. Thus, the pretreating zone 27 is countercurrently thermally regenerated in the manner described above.

The adsorption system 11 also includes identical adsorption zones 75, 77 and 79 the primary purpose of which is to adsorb carbon dioxide. For example, the partially purified fluid stream may have the following composition by volume: Methane 54.53%, carbon dioxide 45.06%, and trace impurities 0.51%. Each of the adsorption zones includes a pair of upright towers 81 and 83 with a conduit 85 interconnecting the upper end of each of the towers 81 with the lower end of each of the associated towers 83. The lower ends of each of the towers 81 can be selectively placed in communication with a feed header 87 by branch conduits 89 and control valves 91, 93 and 95. The upper end of each of the towers 83 can be selectively placed in communication with a product fluid header 97 by control valves 99, 101, and 103, respectively. The lower ends of each of the towers 81 can be selectively placed in communication with a vent header 105 by control valves 107, 109 and 111, respectively. Similarly, the lower ends of each of the towers 81 can be selectively placed in communication with a vacuum header 113 by control valves 115, 117 and 119. The vent header 105 can be selectively placed in communication with the intake of the compressor 19 by valve 121 or with a vent or flare by a valve 123. In the embodiment illustrated, a compressor 125 is operated continuously to evacuate the vacuum header 113.

Each of the towers 81 and 83 is packed with an adsorbent material capable of selectively adsorbing carbon dioxide. Any of the adsorbent materials capable of adsorbing carbon dioxide may be utilized. For example, the adsorbent material in each of the towers 81 and 83 may be natural or synthetic zeolitic molecular sieves or activated carbon; however, molecular sieves are preferred.

At any instant, at least one of the adsorption zones 75, 77 and 79 is on stream for the adsorption of $CO_2$ while the other two are off stream being made ready for subsequent utilization on stream. During time period A (FIG. 3), the adsorption zone 75 is on stream for the adsorption of carbon dioxide impurity, the adsorption zone 77 is coupled to the vent header 105, and the adsorption zone 79 is coupled to the vacuum header 113. Specifically, the valves 91 and 99 are open and the valves 107 and 115 are closed. Accordingly, the partially purified fluid stream from the conduit 51 is introduced into the inlet at the bottom of the tower 81 of the adsorption zone 75. The partially purified fluid stream passes from the lower end of the tower 81 of the adsorption zone 75 through the upper end thereof, the conduit 85 and into the bottom of the tower 83. A product fluid consisting essentially of methane is discharged from the outlet at the upper end of the tower 83 and passes through the valve 99 and into the product header 97. By way of example, the product fluid may be at about 100° F. and 63 psia. A valve 127 (FIG. 1) between the conduit 55 and the product header 97 and a valve 128 are closed to isolate the zones 75, 77 and 79 from the thermal regeneration loop. The valves 127 and 128 can be opened to thermally regenerate the adsorption zones 75, 77 and 79, such regeneration being necessary only very infrequently. Thus, the partially purified fluid stream flows through the towers 81 and 83 of the adsorption zone 75 in series and contacts the adsorbent material therein to adsorb substantially all of the carbon dioxide on the adsorbent material. Product fluid consisting essentially of methane gas is discharged into the product header 97. For example, the product fluid may consist of about 99.25% methane and 0.75% impurity.

Adsorption can take place over a wide range of pressures which can be selected in accordance with the usual operating parameters including the partial pressure of the impurity. For example, the adsorption pressure in the towers 81 and 83 of the zone 75 during time periods A and B may be from 63 to 65 psia.

The adsorption of the $CO_2$ in the adsorption zone 75 continues for time intervals A and B as shown in FIG. 3. The time intervals can be selected by thos skilled in the art depending upon the results desired. By way of example, for a landfill gas having the composition noted above, each of the time intervals A through F in FIG. 3 are of equal duration and of the order of 7½ minutes. During this period a $CO_2$ impurity adsorption front moves progressively from the bottom of the tower 81 of the zone 75 toward the upper end of the tower 83 of the zone 75.

During time period A (FIG. 3), the valves 93, 101, and 117 are closed and the valve 109 is open to place the adsorption zone 77 in communication with the vent header 105. It is assumed that the adsorption zone 77 has previously been on stream for the adsorption of impurity at greater than atmospheric pressure and that the adsorbent material thereof contains carbon dioxide impurity and is near saturation with carbon dioxide. Because it is assumed that the adsorption pressure is above atmospheric pressure, venting or depressurizing of the adsorption zone 77 may be accompoished, in whole or in part, by opening the vent header 105 to atmosphere. However, if the pressure during adsorption were only about atmospheric pressure, some vacuum equipment may be necessary to reduce the pressure in the vent header 105. Thus, although the header 105 is termed herein as a "vent header" it is, in reality, a first stage reduction header.

During the first portion of time period A (FIG.3) the valve 123 is closed and the valve 121 is open. Accordingly, the vent header 105 is placed in communication with the inlet of the compressor 19 (FIG. 1) through a recycle header 129. Thus, the inlet, i.e. the bottom of the tower 81 of the adsorption zone 77, is exposed to a reduced pressure and the towers 81 and 83 of the zone 77 are countercurrently depressurized, i.e. the direction of fluid flow is opposite to the direction of fluid flow in the adsorbing mode, with such depressurization being in series. Althouogh depressurization could be carried out in parallel, one advantage of series depressurization is that fewer valves are required.

When the operation of the adsorption zone 77 in an adsorbing mode is terminated, some partially purified fluid and some purified fluid are trapped in the head space of the towers 81 and 83 of the zone 77 and in the void spaces of the adsorbent material thereof. By recycling through the conduit 129 to the intake of the compressor 19, much of this partially purified fluid and purified fluid can be saved. By way of example, the initial or recycling phase of the venting operation may occur until the pressure within the towers 81 and 83 of the adsorption zone 77 is reduced to about 59 psia. Thereafter, the valve 121 is closed and the valve 123 is opened. This opens the vent header 105 to atmosphere and permits the escaping fluid, which includes impurity, to be passed off into the atmosphere, burned in a flare, or in appropriate instances collected for use or sale. By way of example, at the completion of the venting operation, i.e. at the end of time period A, the pressure in the adsorption zone 77 is approximately atmospheric.

During the period A (FIG. 3) the adsorption zone 79 is in communication with the vacuum header 113. This is accomplished by closing the valves 95, 103 and 111 and opening the valve 119. This places the lower end of the tower 81 of the adsorption zone 79 in communication with the intake of the compressor 125. Thus, the towers 81 and 83 of the adsorption zone 79 are countercurrently evacuated in series. The adsorption zone 79 has been previously on stream for the adsorption of the impurity and has also been previously vented as described above in connection with the adsorption zone 77.

As it is assumed in the specific example described herein that the venting mode reduces the pressure to approximately atmospheric, it is necessary to employ vacuum equipment such as the compressor 125 or a vacuum pump to lower the pressure in the adsorption zone 79 below atmospheric pressure. The general criteria is that the pressure within the adsorption zone 79 be lowered sufficiently so as to desorb the impurity which has previously been adsorbed on the adsorbent material of the adsorption zone 79. The object is to reduce the partial pressure of the $CO_2$ impurity sufficiently to obtain the desorption action desired. By way of example, the pressure within the adsorption zone 79 may be reduced to approximately 10 millimeters Hg at the completion of the vacuum mode. The compressed desorbate gas from the discharge of the compressor 125 may be disposed of or recovered.

During time period A, the adsorption zones 77 and 79 are maintained under less than adsorption pressure. During time period B the adsorption zone 75 continues in the adsorption mode. However, at the beginning of time period B the adsorption zone 77 is switched to the vacuum mode and the adsorption zone 79 is switched to the repressurization mode. Specifically, the valve 109 is closed to isolate the adsorption zone 77 from the vent header 105 and immediately thereafter the valve 117 is opened to place the adsorption zone 77 in communication with the vacuum header 113. Thus, during the time period B the adsorption zone 77 is evacuated and desorbed countercurrently in the manner described above with reference to the adsorption zone 79.

To repressurize the adsorption zone 79, the valve 119 is closed. Closure of the valve 119 should occur prior to the opening of the valve 117 so that the adsorption zones 77 and 79 are not placed in communication with each other. With the valve 119 closed, the valve 103 is opened to countercurrently repressurize the towers 81 and 83 of the adsorption zone 79 in series utilizing methane from the product header 97. Of course, during the period B (FIG. 3) the valves 95 and 111 are maintained closed. The repressurization mode is completed prior to the expiration of time period B.

At the beginning of the time period C (FIG. 3), the valves 95 and 103 are opened to place the adsorption zone 79 on stream between the feed header 87 and the product header 97. Simultaneously therewith or preferably immediately thereafter, the valves 91 and 99 are closed to take the adsorption zone 75 off stream. Thus, during time periods C and D the adsorption zone 79 is on stream for the adsorption of carbon dioxide from the fluid stream from the feed header 87.

At the beginning of period C (FIG. 3), the adsorption zone 75 is placed in communication with the vent header 105 by opening the valve 107. During time period C, the adsorption zone 77 continues to be evacuated by the compressor 125. Thus, the adsorption zone 77 is in communication with the vacuum header 113 during the latter portion of the time that the adsorption zone 75 is on stream and during the initial portion of the time that the adsorption zone 79 is on stream.

The operational sequence for the time periods D, E and F is illustrated in FIG. 3. This can be accomplished by operating the valves of the system 11 in a manner similar to that described in connection with the time periods A, B and C.

From studying the operational sequence shown in FIG. 3, it is apparent that in every other time period, e.g. time periods A, C, E, etc. two of the three adsorption zones are in a pressure reducing mode. Specifically, during these periods one of the adsorption zones is in communication with the vent header 105 and the second of the adsorption zones is in communication with the vacuum header 113.

Secondly, each adsorption zone undergoes impurity removal during a portion of the time that a first of the adsorption zones is used for adsorption and during a portion of the time that a second of the adsorption zones is used for adsorption. For example, during time periods B and C the adsorption zone 77 is being evacuated and during time period B the adsorption zone 75 is on stream and during time period C the adsorption zone 79 is on stream for adsorption.

Finally, utilizing only three adsorption zones a continuous flow of product fluid is obtained.

The operation of the various valves necessary for sequencing the events described herein can be accomplished manually or automatically. Preferably the valves are operated automatically in response to preselected time periods or preselected events.

The specific adsorbent materials, temperatures, and pressures are stated merely by way of example and should not be considered as limiting. Although the above-described embodiment of the invention has been described with reference to recovering methane from a landfill gas, obviously the process can be used for other fluid streams. For example, the invention can be utilized for upgrading hydrogen wherein the feed fluid stream has the following composition:

| Component | Percent by Volume |
|---|---|
| Hydrogen | 79.7 |
| Carbon dioxide | 18.7 |
| Carbon monoxide | 1.3 |
| Methane | 0.3 |

This feed fluid stream can be supplied at, for example, 104° F. and 125 psia to the separator 15. The compressor 21 raises its pressure, for example, to 600 psia and the high pressure fluid is supplied to the pretreating zones 27 and 29 at, for example, 110° F., and discharged therefrom at, for example, 125° F. For example, the partially purified fluid stream leaving the pretreating zones 27 and 29 may have the following composition:

| Component | Percent by Volume |
|---|---|
| Hydrogen | 80.4 |
| Carbon monoxide | 1. |
| Carbon dioxide | 18.5 |
| Methane | 0.1 |

The partially purified feed gas is introduced to the adsorption zones 75, 77, and 79 and a product fluid containing over 99.99% by volume of hydrogen is discharged into the product header 97 at, for example, 125°F and 585 psia.

Although exemplary embodiments of this invention have been shown and described, many changes, modifications and substitutions may be made by those with ordinary skill in the art without necessarily departing from the spirit and scope of this invention.

I claim:

1. A process for purifying a fluid stream which includes an impurity and a product fluid, said process comprising:

providing at least three adsorption zones each of which has an inlet and an outlet, each of the adsorption zones including adsorbent material capable of selectively adsorbing the impurity from the fluid stream;

introducing the fluid stream into the inlet of the first of said adsorption zones and contacting the fluid stream with the adsorbent material of the first adsorption zone at a first pressure to thereby adsorb the impurity in the adsorbent material and provide product fluid;

discharging the product fluid from the outlet of said first adsorption zone during first and second periods;

reducing the pressure in a second of the adsorption zones during the first period to a second pressure which is less than said first pressure, said second adsorption zone having previously been used for adsorption of the impurity from the fluid stream;

reducing the pressure in the second adsorption zone during at least a portion of the second period to a third pressure which is less than said second pressure and which is less than atmospheric pressure to desirb at least some of the impurity from the second adsorption zone;

providing a pressure in a third of the adsorption zones during at least a portion of the first period which is less than said second pressure and which is less than atmospheric pressure to desorb at least some of the impurity from the third adsorption zone, said third adsorption zone having previously had the pressure therein reduced to about the second pressure;

repressurizing the third adsorption zone during at least a portion of the second period;

terminating the inroduction of the fluid stream into the inlet of said first adsorption zone and the repressurization of said third adsorption zone;

introducing the fluid stream into the inlet of the third adsorption zone to adsorb the impurity in the adsorbent material of the third adsorption zone and to provide product fluid;

discharging the product fluid from the outlet of said third adsorption zone during a third period; and maintaining the presure in said second adsorption zone below atmospheric pressure during at least a portion of the third period to desorb some of the impurity from the third adsorption zone during the third period.

2. A process as defined in claim 1 wherein said first mentioned step of reducing includes venting the second adsorption zone to approximately atmospheric pressure.

3. A process as defined in claim 1 including venting the first adsorption zone to approximately atmospheric pressure during the third period.

4. A process as defined in claim 1 wherein the process is carried out with three of said adsorption zones.

5. A process as defined inclaim 1 including reducing the pressure in said first adsorption zone during at least a portion of the third period to lower the pressure in said first adsorption zone to about said second pressure, said second mentioned step of reducing includes evacutating the second adsorption zone, said process includes terminating the evacuation of said second adsorption zone and then initiating the evacuation of said first adsorption zone.

6. A process as defined in claim 1 wherein product fluid is discharged from the first adsorption zone substantially continuously throughout the first and second periods with said first, second and third periods occurring in sequency substantially without any interval therebetween.

7. A process as defined in claim 1 wherein the interval that product fluid is discharged from the first adsorption zone is no greater in duration then about the interval that impurity is being removed from the second adsorption zone.

8. A process as defined in claim 1 wherein said first adsorption zone includes first and second generally upright towers with each of said towers containing adsorbent material capable of selectively adsorbing the impurity from the fluid stream, said towers being coupled in series with said inlet being on said first tower and said outlet being on said second tower, said fluid stream passing through said towers in series.

9. A process as defined in claim 1 including providing at least first and second pretreating zones with each of the pretreating zones including adsorbent material at least a portion of which is different from the adsorbent material in said three adsorption zones and capable of selectively adsorbing a first portion of thempurity from the fluid stream, introducing the fluid stream into the first pretreating zone and contacting the fluid strean with the adsorbent material in said first pretreating zone to adsorb said first portion of the impurity in such absorbent material and to provide a partially purified fluid stream, introducing the partially purified fluid stream into the inlet of said first adsorption zone and desorbing the second pretreating zone during at least a portion of the time that the fluid stream is contacting the adsorbent material in the first pretreating zone.

10. A process as defined inclaim 9 wherein each of said first adsorption zones includes first and second towers with each of said towers containing adsorbent material capable of selectively adsorbing the impurity from the fluid stream, said towers of each of said adsorption zones being coupled in series with said inlet of each of said adsorption zones being on the first tower thereof and the outlet of each of said adsorption zones being on the second tower thereof.

11. A process for purifying a fluid stream which includes an impurity and a product fluid, said process comprising:
providing three adsorption zones each of which has an inlet and an outlet, each of the adsorption zones including adsorbent material capable of selectively adsorbing the impurity from the fluid stream;
cycling each of the adsorption zones on stream for the adsorption of the impurity from the fluid stream in a predetermined sequence to provide a substantially uninterrupted flow of the product fluid from the adsorption zones;
said step of cycling including introducing the fluid stream into a first of the adsorption zones to adsorb impurity and provide the product fluid, terminating the introduction of the fluid stream into the first adsorption zone and introducing the fluid stream into a second of the adsorption zones to adsorb impurity and provide the product fluid;
desirbing the impurity from each of the adsorption zones in a predetermined sequence by sequentially reducing the pressure within each of the adsorption zones sufficiently to desorb the impurity;
the durations of the periods of desorption for each of the adsorption zones being at least as great as about the durations of the periods of on stream adsorption of the impurity for such adsorption zones, respectively;
repressurizing each of the adsorption zones subsequent to the desorption of such adsorption zone to make such adsorption zone ready for subsequent use for on stream adsorption of the impurity; and
said step of cycling being carried out so that the desorption of a third of the adsorption zones occurs during at least the latter portion of the period that the first adsorption zone is on stream for the adsorption of the impurity and during at least an initial portion of the period that the second adsorption zone is on stream for the adsorption of the impurity.

12. A process as defined in claim 11 wherein said step of desorbing includes sequentially reducing the pressure in each of said adsorption zones to a pressure less than atmospheric pressure with the termination of the desorption in one of the adsorption zones and the initiation of the desorption of the next of the adsorption zones to be desorbed occurring at about the same time.

13. A process as defined in claim 11 wherein the repressurization of the first adsorption zone is carried out for a period which is of less duration than the period of on stream adsorption of the first adsorption zone and of less duration than the period of desorption for the first adsorption zone.

14. A process for purifying a fluid stream which includes an impurity and a product fluid, said process comprising:
providing first and second pretreating zones with each of the zones including adsorbent material capable of selectively adsorbing at least a portion of the impurity from the feed fluid stream;
passing the feed fluid stream through the first pretreating zone and contacting the feed fluid stream with the adsorbent material thereof to adsorb said portion of the impurity in the adsorbent material and provide a partially purified fluid stream;
desorbing the second pretreating zone during at least a portion of the period that the first pretreating zone is providing a partially purified fluid stream;
providing at least two primary adsorption zones each of which includes first and second generally upright towers and adsorbent material in each of said towers capable of selectively adsorbing the impurity from the fluid stream, each of said primary adsorption zones having an inlet on the first tower thereof and an outlet on the second tower thereof
passing the partially purified fluid stream in series through the first and second towers of the first primary adsorption zone from the inlet of the first primary adsorption zone and contacting the fluid stream with the adsorbent material in said first and second towers of the first primary adsorption zone at a first pressure to thereby adsorb the impurity on the adsorbent material of the first primary adsorption zone and provide product fluid;
discharging product fluid from the outlet of the first primary adsorption zone;
desorbing the second primary adsorption zone which has previously been on stream for the adsorption of impurity to remove the impurity therefrom for at last a portion of the period that the product fluid is being discharged from the first adsorption zone;
terminating the adsorption in said towers of said first primary adsorption zone and thereafter desorbing the first adsorption zone; and
terminating the impurity removal from said second primary adsorption zone and thereafter passing the partially purified fluid stream in series through the first and second towers of the second primary adsorption zone to adsorb the impurity on the adsorbent material of the second primary adsorption zone and provide product fluid.

15. A process as defined in claim 14 wherein said step of desorbing includes exposing the towers of the second adsorption zone in series to a relatively low pressure.

16. A process as defined in claim 14 including providing a third primary adsorption zone including first and second generally upright towers and adsorbent material in each of said towers capable of selectively adsorbing the impurity from the fluid stream, said third primary adsorption zone having an inlet on the first tower thereof and an outlet on the second tower thereof, said first mentioned step of desorbing includes reducing the pressure in the towers of the second primary adsorption zone to a second pressure which is sufficiently low to remove the impurity from the second primary adsorption zone, and depressurizing the third primary dsorption zone which has been previously on stream for the adsorption of impurity to a third pressure during at least a portion of the period that the first primary adsorption zone is on stream for the adsorption of impurity, said third pressure being intermediate said first and second pressures.

17. A process as defined in claim 16 wherein the towers of said second adsorption zone are countercurrently desorbed in series and the towers of said third adsorption zone are countercurrently depressurized in series.

18. A process as defined in claim 14 wherein each of the pretreating zones includes adsorbent material different from the adsorbent material in said two primary adsorption zones.

19. A process of obtaining methane from a sanitary landfill comprising:
  extracting a feed fluid stream comtaining methane and an impurity from a sanitary landfill;
  providing first and second pretreating zones with each of the zones including adsorbent material capable of selectively adsorbing at least a portion of the impurity from the feed fluid stream;
  passing the feed fluid stream through the first pretreating zone and contacting the feed fluid stream with the adsorbent material thereof to adsorb said portion of the impurity in the adsorbent material and provide a partially purified fluid stream;
  desorbing the second pretreating zone during at least a portion of the period that the first pretreating zone is providing a partially purified fluid stream;
  providing at least three adsorption zones each of which has an inlet and an outlet and includes adsorbent material capable of selectively adsorbing at least a second portion of the impurity from the partially purified fluid stream;
  introducing the partially purified fluid stream into the inlet of the first of said adsorption zones and contacting the partially purified fluid stream with the adsorbent material of the first adsorption zone at a first pressure to thereby adsorb the second portion of the impurity in the adsorbent material and to provide substantially pure methane;
  discharging the methane from the outlet of said first adsorption zone during a first period;
  reducing the pressure in a second of the adsorption zones to a second pressure during the first period, said second adsorption zone having been previously used to adsorb the second portion of the impurity from the partially purified fluid stream;
  providing a third pressure in a third of the adsorption zones during a portion of the first period with the third pressure being sufficiently lowto remove at least some of the impurity from the adsorbent material of the third adsorption zone, said third adsorption zone having been previously reduced to said second pressure;
  repressurizing the third adsorption zone during a portion of the first period;
  terminating the introduction of the partially purified fluid stream into the first adsorption zone at the end of the first period;
  introducing the partially purified fluid stream into the inlet of the third adsorption zone and contacting the partially purified fluid stream with the adsorbent material of the third adsorption zone to thereby adsorb the second portion of the impurity in the adsorbent material and to provide substantially pure methane;
  discharging the methane from the outlet of said third adsorption zone during a second period;
  reducing the pressure in the second adsorption zone to a desorption pressure less than said second pressure and sufficiently low to remove at least some of the impurity from the adsorbent material of the second adsorption zone; and
  maintaining said desorption pressure in said second adsorption zone for a portion of said first period and a portion of said second period.

20. A process as defined in claim 19 wherein the step of desorbing the second pretreating zone includes thermally desorbing the second pretreating zone.

21. A process as defined in claim 19 wherein said first mentioned step of reducing includes depressurizing the second adsorption zone to a first pressure level and recycling the partially purified feed gas trapped in the second adsorption zone, terminating said recycling, and subsequently venting the second adsorption zone to the second pressure.

22. A process as defined in claim 19 wherein said first adsorption zone includes first and second upright towers and said step of contacting the partially purified fluid stream with the adsorbent material of the first adsorption zone includes passing the partially purified fluid stream in series through the first and second towers of the first adsorption zone.

* * * * *